United States Patent [19]
Aoyama et al.

[11] Patent Number: 5,880,577
[45] Date of Patent: Mar. 9, 1999

[54] VEHICLE GENERATOR CONTROL SYSTEM

[75] Inventors: Tooru Aoyama, Okazaki; Kouzi Tanaka, Anjo, both of Japan

[73] Assignee: Nippondenso Co., Ltd., Kariya, Japan

[21] Appl. No.: 670,755

[22] Filed: Jun. 21, 1996

[30] Foreign Application Priority Data

Jun. 23, 1995 [JP] Japan ................................. 7-158095

[51] Int. Cl.⁶ .................................................. H02P 9/08
[52] U.S. Cl. .................................. 322/29; 322/18; 322/36
[58] Field of Search ................................. 322/29, 18, 14, 322/28, 10; 290/40 B, 13

[56] References Cited

U.S. PATENT DOCUMENTS

| | | | |
|---|---|---|---|
| 4,459,489 | 7/1984 | Kirk et al. | 290/13 |
| 4,629,968 | 12/1986 | Butts et al. | 322/29 |
| 4,636,706 | 1/1987 | Bowman et al. | 322/28 |
| 4,682,044 | 7/1987 | Hotate et al. | 290/40 B |
| 4,686,446 | 8/1987 | Nishimura et al. | 322/33 |
| 4,689,545 | 8/1987 | Komurasaki et al. | 322/14 |
| 4,739,243 | 4/1988 | Iwatani et al. | 322/10 |
| 4,789,817 | 12/1988 | Asakura et al. | 322/28 |
| 5,057,764 | 10/1991 | Fujimoto et al. | 322/14 |
| 5,144,220 | 9/1992 | Iwatani et al. | 322/28 |
| 5,512,813 | 4/1996 | Uchinami | 322/28 |
| 5,621,304 | 4/1997 | Kiuchi et al. | 322/18 |

FOREIGN PATENT DOCUMENTS

| | | |
|---|---|---|
| 430203 | 6/1991 | European Pat. Off. |
| 430208 | 6/1991 | European Pat. Off. |
| 510527 | 10/1992 | European Pat. Off. |
| 545616 | 6/1993 | European Pat. Off. |
| 577987 | 1/1994 | European Pat. Off. |
| 59-157555 | 10/1984 | Japan |
| 59-189498 | 12/1984 | Japan |
| 61-171879 | 8/1986 | Japan |
| 3-143300 | 6/1991 | Japan |
| 3-173324 | 7/1991 | Japan |
| 6-261466 | 9/1994 | Japan |

*Primary Examiner*—Nestor Ramirez
*Assistant Examiner*—Nicholas Ponomarenko
*Attorney, Agent, or Firm*—Pillsbury Madison & Sutro LLP

[57] ABSTRACT

A vehicular generator unit includes an alternator and a generator control system that controls the alternator. The alternator is driven by an engine to achieve the power generation for charging a battery. The generator control system includes a transistor for intermitting a field current therethrough so as to control the power generation of the alternator. The system further includes a switching circuit which suppresses the duty of the transistor to a low value, where the alternator can not perform the power generation for the battery, until complete engine start-up or self-rotation is detected. On the other hand, when start-up is detected, the duty of the transistor is switched to a value where the alternator can perform the power generation for the battery. The duty of the transistor is then increased gradually to 100%.

24 Claims, 7 Drawing Sheets

VEHICLE GENERATOR CONTROL SYSTEM

BACKGROUND OF THE INVENTION

1. Field of the Invention

The present invention relates to a vehicle generator control system for controlling the power generation of a generator driven by an internal combustion engine, and more specifically, to a vehicle generator control system which is capable of ensuring the excellent starting property of the engine as well as the stable operation of the engine immediately after the engine start-up.

2. Description of the Prior Art

There have been various techniques proposed, wherein the power generated by the generator is limited during cranking for starting the engine or immediately after the engine start-up when the engine is unstable, in order to improve the starting property of the engine and stabilize the rotation of the engine.

For example, Japanese First (unexamined) Utility Model Publication No. 59-157555 discloses a technique, wherein an alternator performs the power generation until the complete explosion or start-up of the engine (i.e., the state in which the engine is selfrotating or rotates independent of the starter); is detected, while the power generation is stopped for a given period of time after detection of the complete explosion. The power generated is and restarted thereafter so as to ensure the stable engine rotation immediately after the engine start-up.

Japanese First (unexamined) Patent Publication No. 6-261466 discloses a technique, which detects the termination of engine cranking based on the output voltage of a generator.

The exciting current to the generator is limited to a constant value for a given period of time so as to substantially stop the power generation of the generator, and then the exciting current to the generator is gradually increased. Because this technique, reduces the power generation load immediately after the engine start-up and subsequently increases the power generation load the stable engine rotation immediately after the engine start-up is ensured.

However, in the foregoing techniques, because the maximum exciting current is fed to the generator during engine cranking, the power generation torque required at that time causes a reduction in the cranking speed thereby comprising the engine starting property. Further, because the power generation is substantially stopped for a given time period after the completion of cranking and at a time where various electrical loads in the vehicle start to operate, there is a tendency for a shortage of power to occur.

In view of this, various techniques have been proposed wherein the power generation is stopped while the engine is under cranking.

For example, Japanese First (unexamined) Patent Publication No. 3-143300 discloses a technique wherein an alternator stops the power generation for a given time period after an ignition switch is operated to a starter drive position, so as to reduce a load applied to the engine.

Japanese First (unexamined) Patent Publication No. 3-173324 discloses a technique wherein exciting current to a generator is limited to a constant value so as to substantially stop the power generation immediately after starting the generator. After a lapse of time, the exciting current is then gradually increased to enhance the power generation, thereby shifting to the normal power generating operation.

However, unevenness in the time periods required for starting up the engine or stabilizing the engine rotation due to temperature conditions can not be dealt simply by stopping the power generation for the fixed time period as described above.

Because of this, other techniques have been proposed, that monitor actual engine operating conditions so as to control the power generation without relying on timers.

For example, Japanese First (unexamined) Patent Publication No. 61-171879 discloses a technique wherein a generator stops the power generation during engine cranking and starts the power generation when the termination of cranking is detected, based on the monitored engine speed.

Japanese First (unexamined) Utility Model Publication No. 59-189498 discloses another technique wherein the output of a generator is suppressed while the engine speed is not greater than idling speed.

However, in these techniques, the generator abruptly starts the power generation as the engine cranking is finished or the engine speed increases to exceed the idling speed, so that the corresponding load is abruptly applied to the engine. This tends to cause unstable engine rotation and, in some cases, engine stall.

SUMMARY OF THE INVENTION

Therefore, it is an object of the present invention to provide an improved generator control system.

According to one aspect of the present invention, a generator control system for controlling an output of a generator driven by an engine, comprising an output control device for changing the output of the generator in response to an output command value; discriminating means for discriminating between an engine cranking state and an engine self-rotating state; suppressing means for suppressing the output command value to the output control device so as to stop or limit the output of the generator when the engine cranking state is discriminated by the discriminating means; and increasing means for gradually increasing the output command value to the output control device after the engine self-rotating state is discriminated by the discriminating means.

The discriminating means comprises detecting means for producing a detection signal indicative of an engine speed, the discriminating means having a detection level which is set between an upper limit speed when the engine is cranked and a lower limit speed under idling where the engine rotates by itself, and the discriminating means discriminates between the engine cranking state and the engine self-rotating state based on a comparison between the detection level and the detection signal produced by the detecting means.

The detecting means produces the detection signal depending on the output of the generator outputted as a function of the output command value and the engine speed.

Moreover, the suppressing means suppresses the output command value to the output control device to a fixed value, and that the discriminating means discriminates between the engine cranking state and the engine self-rotating state based on the output of the generator achieved by the suppressed fixed output command value.

Furthermore, the increasing means gradually increases the output command value starting from a value which is greater than the fixed output command value given by the suppressing means.

It may be arranged that the increasing means comprises control means for giving the output command value to the output control device so that the output of the generator converges to a given target value, integrating means for integrating the output command value given to the output control device, and limiting means for limiting the output command value given to the output control device depending on an integration output from the integrating means, and that the integrating means is arranged to further integrate a control amount of the output control device determined depending on the fixed output command value given by the suppressing means.

In addition, the integrating means is arranged to integrate a control amount of the output control device determined depending on the output command value given to the output control device.

Also, the detecting means is inputted with an output of the generator at one end of stator coils of the generator.

Further, the suppressing means feeds the fixed output command value corresponding to an exciting current which can be continuously supplied to the generator in a state where the generator is not rotated.

Also, the suppressing means suppresses the output command value to the output control device to no more than 20% or in the alternative, to about 15%.

Also, the detecting means is inputted with a signal from an engine speed sensor monitoring a speed of the engine.

In addition, means are further provided for detecting an operation of an engine starter, and that the discriminating means includes first discriminating means for discriminating the engine self-rotating state when the engine speed exceeds the detection level during the engine starter being operated, and second discriminating means for discriminating the engine self-rotating state when the engine speed exceeds the lower limit idling speed during the engine starter being stopped.

Moreover, the increasing means comprises control means for giving the output command value to the output control device so that the output of the generator converges to a given target value, and limiting means for limiting an increasing rate of the output command value given to the output control device from the control means.

Furthermore, the control means is provided integral with the generator or that it includes a microcomputer.

Further, the output control device is an element which controls an exciting current of the generator in response to the output command value.

Also, the display means is further provided so that it a display state when the engine self-rotating state is discriminated by the discriminating means.

According to another aspect of the present invention, a generator control system for charging a battery by means of an output of an alternator driven by a vehicle engine, comprises a supply circuit for supplying the alternator with an exciting current depending on a control signal; a control circuit for outputting the control signal of the supply circuit so that a voltage of the battery converges to a given target value; a suppressing circuit for outputting a fixed control signal, the fixed control signal suppressing the output of the alternator to a small value such that no charging current to the battery is generated; a gradually exciting circuit for liming an increasing rate of the control signal given to the supply circuit; a discriminating circuit for discriminating between an engine cranking state and an engine self-rotating state based on an output from the alternator determined depending on the fixed control signal from the suppressing circuit; and a control characteristic changing circuit for giving the control signal from the suppressing circuit to the supply circuit when the engine cranking state is discriminated by the discriminating circuit, and for giving the control signal from the control circuit to the supply circuit under the limitation by the gradually exciting circuit when the engine self-rotating state is discriminated by the discriminating circuit.

Moreover, that the gradually exciting circuit comprises an integrating circuit for integrating an exciting current supply amount by the supply circuit, and a limiting circuit for limiting the control signal given to the supply circuit depending on an integration output from the integrating circuit.

Furthermore, the discriminating circuit has a detection level which is set between an upper limit speed when the engine is cranked and a lower limit speed under idling where the engine rotates by itself, and that the discriminating circuit discriminates between the engine cranking state and the engine self-rotating state based on a comparison between the detection level and the output of the alternator.

In addition, the suppressing circuit feeds the fixed control signal corresponding to an exciting current which can be continuously supplied to the alternator in a state where the alternator is not rotated.

Further, the suppressing circuit feeds the fixed control signal representing the duty of the supply circuit of no more than 20%.

Lastly, the suppressing circuit feeds the fixed control signal representing the duty of the supply circuit of about 15%.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

The first preferred embodiment will be described hereinbelow with reference to FIGS. 1 to 4.

Figure 1:
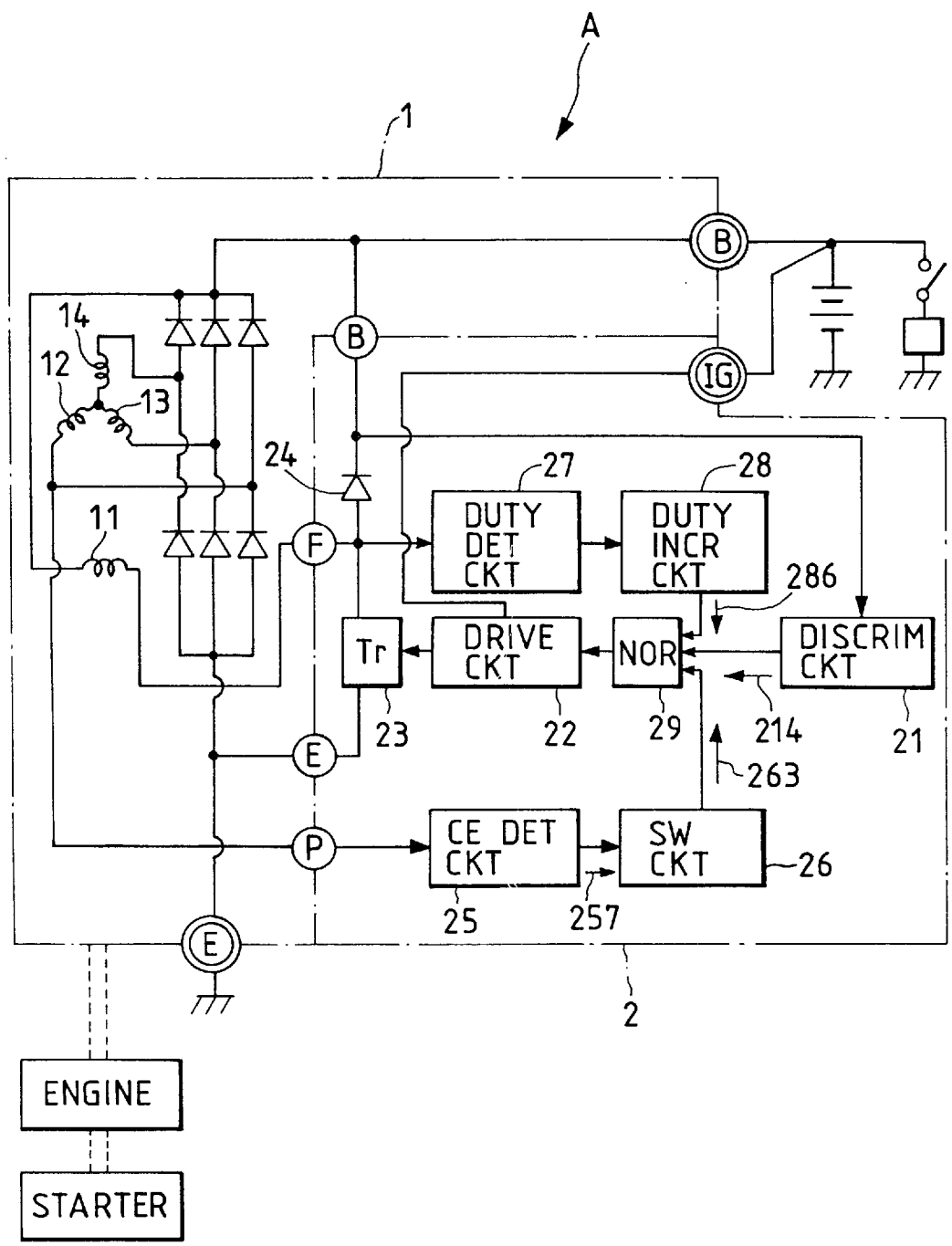
FIG. 1 is a block diagram showing a generator unit for a vehicle including an alternator and a generator (alternator) control system according to a first preferred embodiment of the present invention.

As shown in FIG. 1, a vehicle generator unit A includes an alternator 1 driven by an internal combustion engine and a generator (alternator) control system 2 incorporated in a casing of the alternator 1.

The alternator 1 is in the form of a three-phase generator, and includes a field coil 11 wound around a rotor and three-phase stator coils 12, 13 and 14 wound around a stator core.

The generator control system 2 includes a discrimination circuit 21, a drive circuit 22, a transistor 23 forming current control means, a flywheel diode 24, a complete explosion or engine self-rotation detection circuit 25, a switching circuit 26 for switching between an initial exciting control and a full exciting control, a duty detection circuit 27, a duty increasing circuit 28 for gradually increasing the duty of the transistor 23, and a NOR circuit 29.

Figure 3:
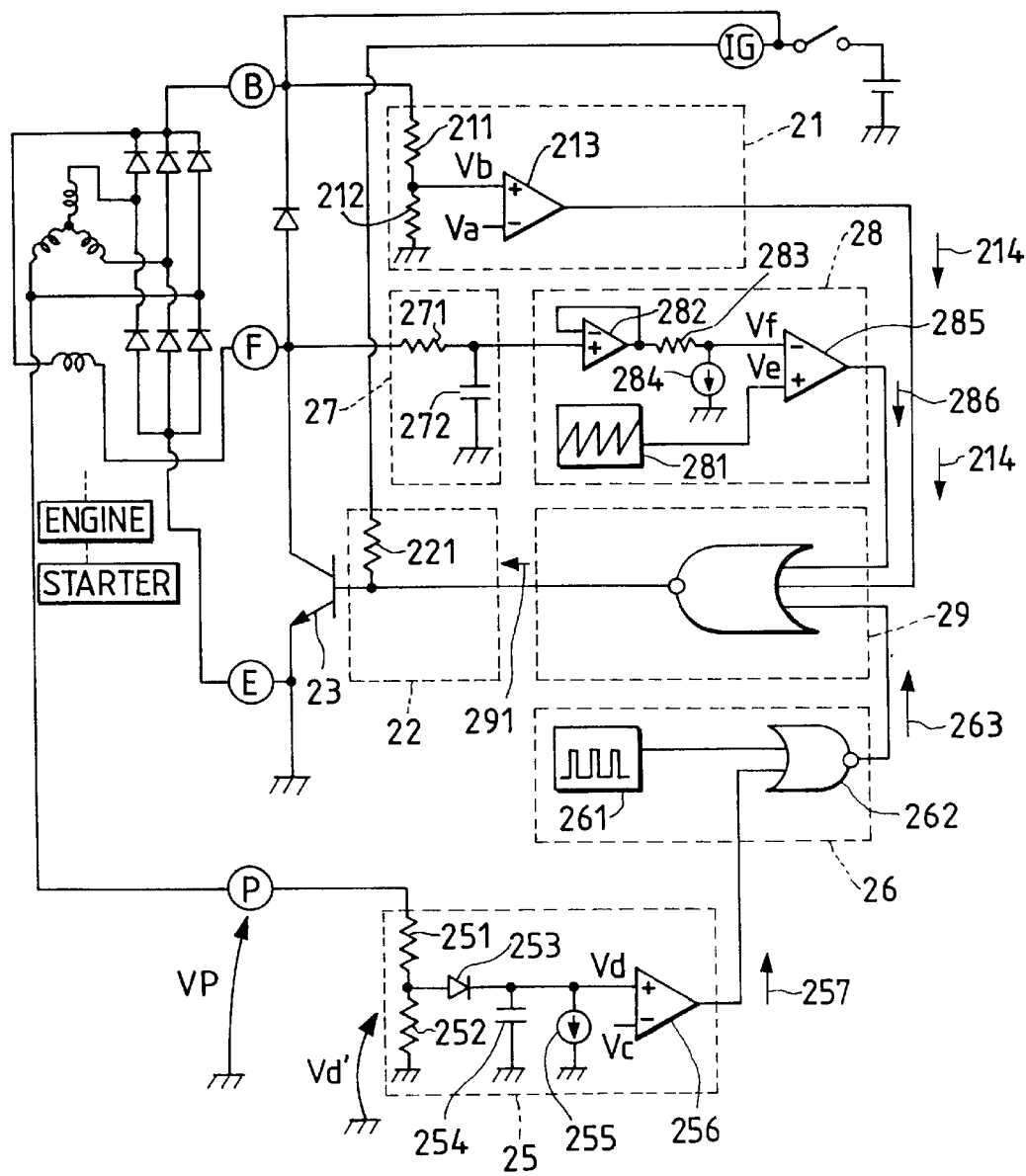
FIG. 3 is a circuit diagram showing the generator unit of FIG. 1 in a more detailed fashion.
Figure 4:
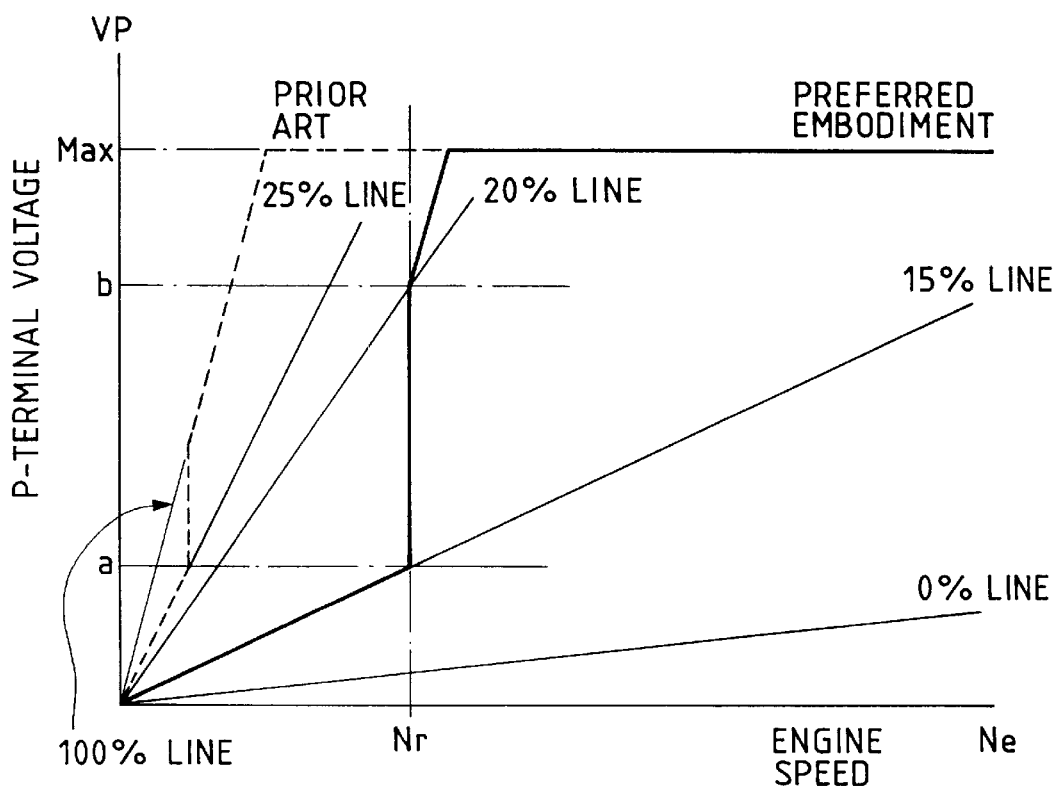
FIG. 4 is a graph showing a relationship between engine speed Ne and P-terminal voltage VP per duty.

As shown in FIG. 3, the discrimination circuit 21 includes voltage dividing resistors 211 and 212 for dividing a B-terminal voltage (voltage between B terminal and E terminal) to provide a voltage Vb, and a comparator 213 for comparing the voltage Vb with a reference voltage Va. When Vb<Va, an output 214 of the comparator 213 becomes Lo (low).

The drive circuit 22 includes a resistor 221 for providing a bias voltage for driving the transistor 23.

The complete explosion or engine self-rotation detection circuit 25 receives a generated output of the alternator 1 at one end of the stator coils. The detection circuit 25 includes voltage dividing resistors 251 and 252 for dividing a P-terminal voltage VP (voltage between P terminal and E terminal) to provide a voltage Vd', a diode 253 for preventing reverse-current flow, a capacitor 254 for charging based on the voltage Vd', a constant current source 255 for discharging the capacitor 254 to cause a terminal voltage Vd thereof to follow the P-terminal voltage VP, and a comparator 256 for comparing the terminal voltage Vd with a reference voltage Vc. When Vd≧Vc, an output 257 of the comparator 256 becomes Hi (high). The high output 257 represents detection of a state of complete explosion of the engine or an engine self-rotating state where the engine rotates by itself as opposed to an engine cranking state where the engine is rotated by a starter.

A complete explosion indicative threshold engine speed Nr (corresponding to point a in FIG. 4 where Vd=Vc) is set to a value which is higher than a maximum cranking speed (200 to 300 rpm) at the low temperatures less than a given value, and lower than an idling speed. The reason for this is that, while the engine is under cranking by means of the starter, the engine is not in the state of complete explosion, on the other hand, once the engine is operated in the state of complete explosion, the engine speed is not lowered below the idling speed.

The switching circuit 26 includes a pulse generator 261 for the initial excitation and a NOR circuit 262. When the output 257 of the complete explosion detection circuit 25 is Lo (detection of engine cranking state), the switching circuit 26 outputs an inverted waveform of the pulse generator 261 as an output 263. On the other hand, when the output 257 of the detection circuit 25 is Hi (detection of complete explosion state), the output 263 of the switching circuit 26 is always Lo.

The duty detection circuit 27 is in the form of an integration circuit including a resistor 271 and a capacitor 272. The duty detection circuit 27 detects the mean duty of the transistor 23 by converting it to the voltage change. Specifically, when the transistor 23 is conductive (on), an F-terminal voltage (voltage between F terminal and E terminal) is at low level so that the capacitor 272 discharges via the resistor 271. On the other hand, when the transistor 23 is non-conductive (off), the F-terminal voltage is at high level so that the capacitor 272 charges via the resistor 271.

The duty increasing circuit 28 includes a sawtooth generator 281, an operational amplifier 282, a resistor 283 and a constant current circuit 284 forming a +α circuit, and a comparator 285.

The operational amplifier 282 is in the form of a voltage follower with a high input impedance and monitors a terminal voltage of the capacitor 272.

The +α circuit lowers an output of the operational amplifier 282 so as to increase a duty level of the transistor 23 by +α.

The comparator 285 compares a signal Vf lowered via the +α circuit with a sawtooth signal Ve. While Vf<Ve, output 286 is Lo. On the other hand, while Vf>Ve, the output 286 is Hi.

With the foregoing configuration, after the detection of complete explosion (time t2 in FIG. 2), a time period where Vf<Ve is satisfied becomes greater so that the duty of the transistor 23 is gradually increased.

It may be arranged that, instead of adding the voltage dropping circuit to provide Vf for increasing the duty by +α, a voltage raising circuit may be added to raise the reference sawtooth signal.

The NOR circuit 29 is inputted with the output 214 of the discrimination circuit 21, the output 263 of the switching circuit and the output 286 of the comparator 285. During a time period where all the outputs 214, 263 and 286 become Lo, an output 291 of the NOR circuit 29 becomes Hi. While the output 291 is Hi, the transistor 23 is rendered conductive (on).

Now, an operation of the generator unit A will be described using a time chart shown in FIG. 2.

Figure 2:
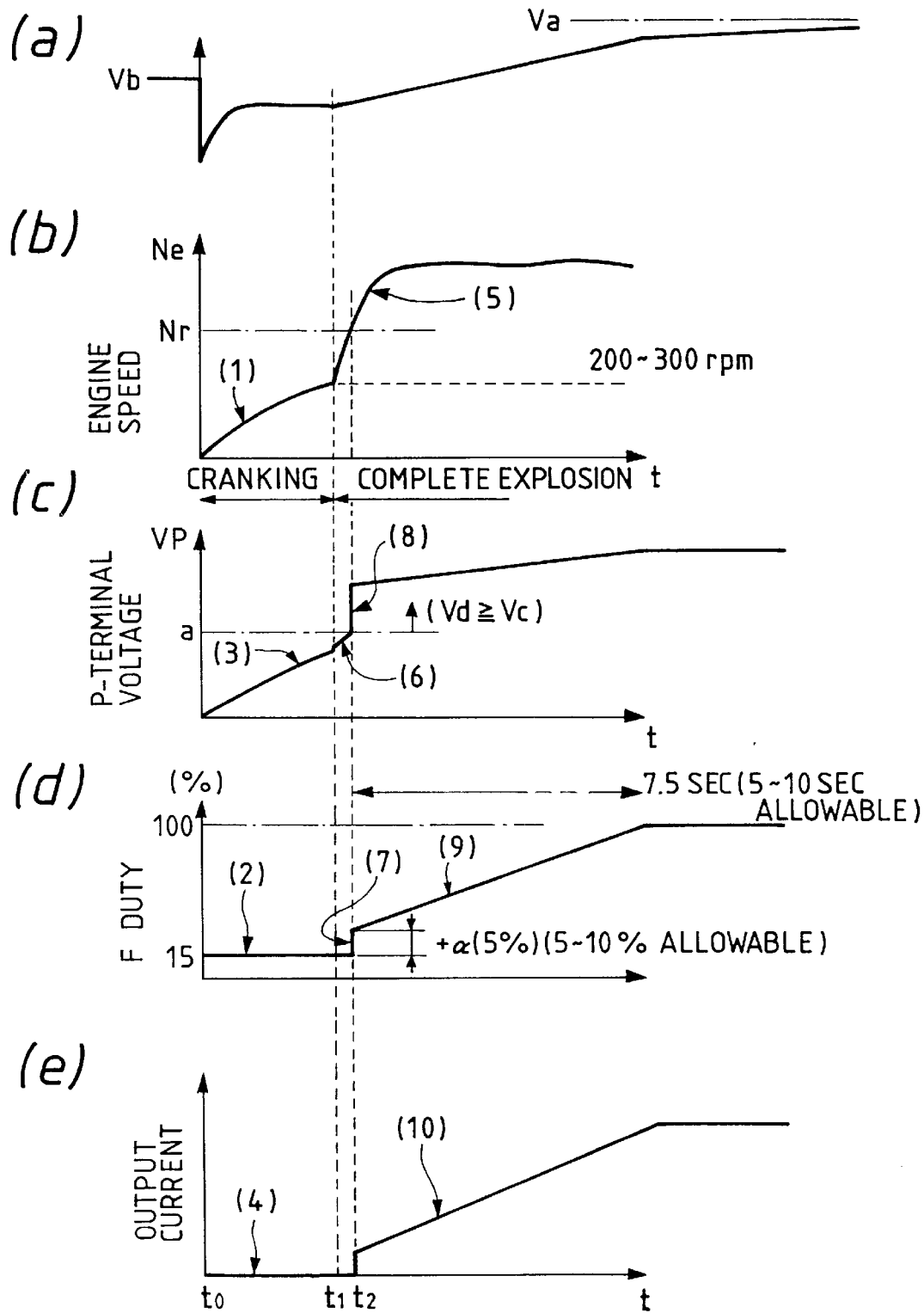
FIG. 2 is a time chart for explaining an operation of the generator unit shown in FIG. 1, wherein (a) is a graph showing a relationship between elapsed time t and divided voltage Vb, (b) is a graph showing a relationship between elapsed time t and engine speed Ne, (c) is a graph showing a relationship between elapsed time t and P-terminal voltage VP, (d) is a graph showing a relationship between elapsed time t and F duty, and (e) is a graph showing a relationship between elapsed time t and output current.

When the starter is operated at time to, the engine is cranked by means of the starter so that the engine speed Ne increases as shown by (1) at (b) in FIG. 2. As appreciated, since the B-terminal voltage drops [(a) in FIG. 2 where Vb<Va] due to the operation of the starter, the output 214 of the discrimination circuit 21 becomes Lo.

The switching circuit 26 outputs the inverted signal of the pulse generator 261 to the NOR circuit 29.

During cranking (t0·t1), the P-terminal voltage VP increases due to the cranking. However, since the transistor 23 is operated with the low duty (15% in this embodiment) where the voltage generated by the alternator 1 is set lower than the battery voltage, the alternator 1 provides no output to the battery and performs only the internal power generation (see (4) at (e) in FIG. 2 where the output current is zero). Hence, the terminal voltage Vd is less than the reference voltage Vc so that the output 257 of the complete explosion detection circuit 25 is Lo. Since the alternator 1 provides no output to the battery during cranking, the load applied to the engine can be reduced. As shown by (3) at (c) in FIG. 2, the P-terminal voltage VP increases gradually.

As appreciated, about the 15% duty is necessary for the detection of complete explosion. As further appreciated, the 15% duty is determined by the fixed control signal outputted from the pulse generator 261. This fixed control signal corresponds to an exciting current which can be continuously supplied to the alternator 1 in a state where the alternator 1 is not rotated.

When the complete explosion occurs at time t1, the engine speed Ne abruptly increases as shown by (5) at (b) in FIG. 2. Thus, as shown by (6) at (c) in FIG. 2, the P-terminal voltage VP reaches the threshold value a where Vd=Vc so that the output 257 of the detection circuit 25 becomes Hi to detect the complete explosion. Hence, the output 263 of the switching circuit 26 is held Lo thereafter (Vd≧Vc).

Thus, at time t2, the duty of the transistor 23 is increased by +α (15% in this embodiment). Accordingly, as shown at (e) in FIG. 2, the alternator 1 starts power generation to the battery at time t2. Following this, the P-terminal voltage VP changes as shown by (8) at (c) in FIG. 2. As shown at (d) in FIG. 2, the duty of the transistor 23 is gradually increased so as to reach 100% in 7.5 seconds, and the output current of the alternator 1 is also increased corresponding to the increasing duty as shown by (10) at (e) in FIG. 2. With this arrangement, the engine load is not abruptly increased so as to ensure that the engine speed rises smoothly. A value of +α may be selectable, for example, in the range of 5% to 10% and a duty increasing time may be selectable, for example, in the range of 5 seconds to 10 seconds.

When the duty of the transistor 23 reaches 100%, the power generation of the alternator 1 and the P-terminal voltage VP are saturated.

Further, when the battery is fully charged so that Vb≧Va, the output 214 of the discrimination circuit 21 becomes Hi to cause the duty of the transistor 23 to be zero. Thus, the power generation of the alternator 1 is stopped.

Now, the advantages in this preferred embodiment will be described.

[A] While Vd<Vc with the P-terminal voltage VP increasing, the transistor 23 is operated with the low duty of 15% so as to prevent the external power generation of the alternator 1 to the battery. This reduces the engine load. As appreciated, since the complete explosion engine speed Nr is detected by the threshold value a (Vd=Vc), about the 15% duty is necessary.

When Vd≧Vc, the duty of the transistor 23 is increased by +α, that is, 5%, so as to set the duty to 20%, and then the duty is gradually increased for example,100% in 7.5 seconds. With this arrangement, the engine load immediately after the start-up of the engine is prevented from abruptly increasing, thereby ensuring that the engine speed increases smoothly.

Thus, the vehicle generator unit A is excellent in engine starting property, particularly at the low temperatures.

There exists a prior art technique, wherein about a 25% duty control is performed for preventing the external power generation immediately after turning on the ignition switch. However, in this prior art technique, as shown by a thick dotted line in FIG. 4, when initial excitation is changed to the full excitation at the threshold value a of the P-terminal voltage, the 100% duty control is performed during cranking so that the external power generation is achieved before the complete explosion.

[B] The threshold value a of the P-terminal voltage VP is set higher than a value corresponding to the saturation engine speed at the cold temperatures during engine cranking, and the complete explosion is detected by the detection circuit 25 based on Vd≧Vc. Accordingly, a microcomputer for detecting the complete explosion based on output signals from, for example, a water temperature sensor, the ignition switch and spark plugs, and signal lines for feeding the output signals to an ECU (electronic control unit) are not necessary.

With this arrangement, the generator control system 2 can be incorporated in the alternator casing. Thus, simplification of the system, omission of connection lines from the ECU, improvement in reliability and cost reduction can be achieved.

Now, the second preferred embodiment will be described hereinbelow with reference to FIG. 5.

The P-terminal voltage VP may be used as a sensor signal for notifying the complete explosion (engine self-rotating state) by means of lights-out of a lamp. In this case, a threshold value b is used for detecting the complete explosion.

It is necessary that the threshold value a for switching from the initial excitation to the full excitation is set lower than the threshold value b for the lamp control. Thus, for detecting the complete explosion engine speed Nr with the conventional duty, the threshold value a should be set greater than the threshold value b, and hence the initial excitation control and the lamp control can not be established both.

For solving this, it is necessary that the threshold value a for switching between the initial excitation and the full excitation is set smaller than the threshold value b and greater than a saturation voltage generated by the residual magnetic flux with no current flowing in the excitation circuit of the alternator 1. Specifically, the threshold value a is set as "saturation voltage<a≦b", and the initial excitation duty is set as "0%<duty≦20%" in the P-terminal voltage characteristic (FIG. 4) obtained by duty-controlling the exciting current.

For example, by detecting the complete explosion engine speed Nr with the threshold value a, the initial excitation duty is set to 15%.

Figure 5:
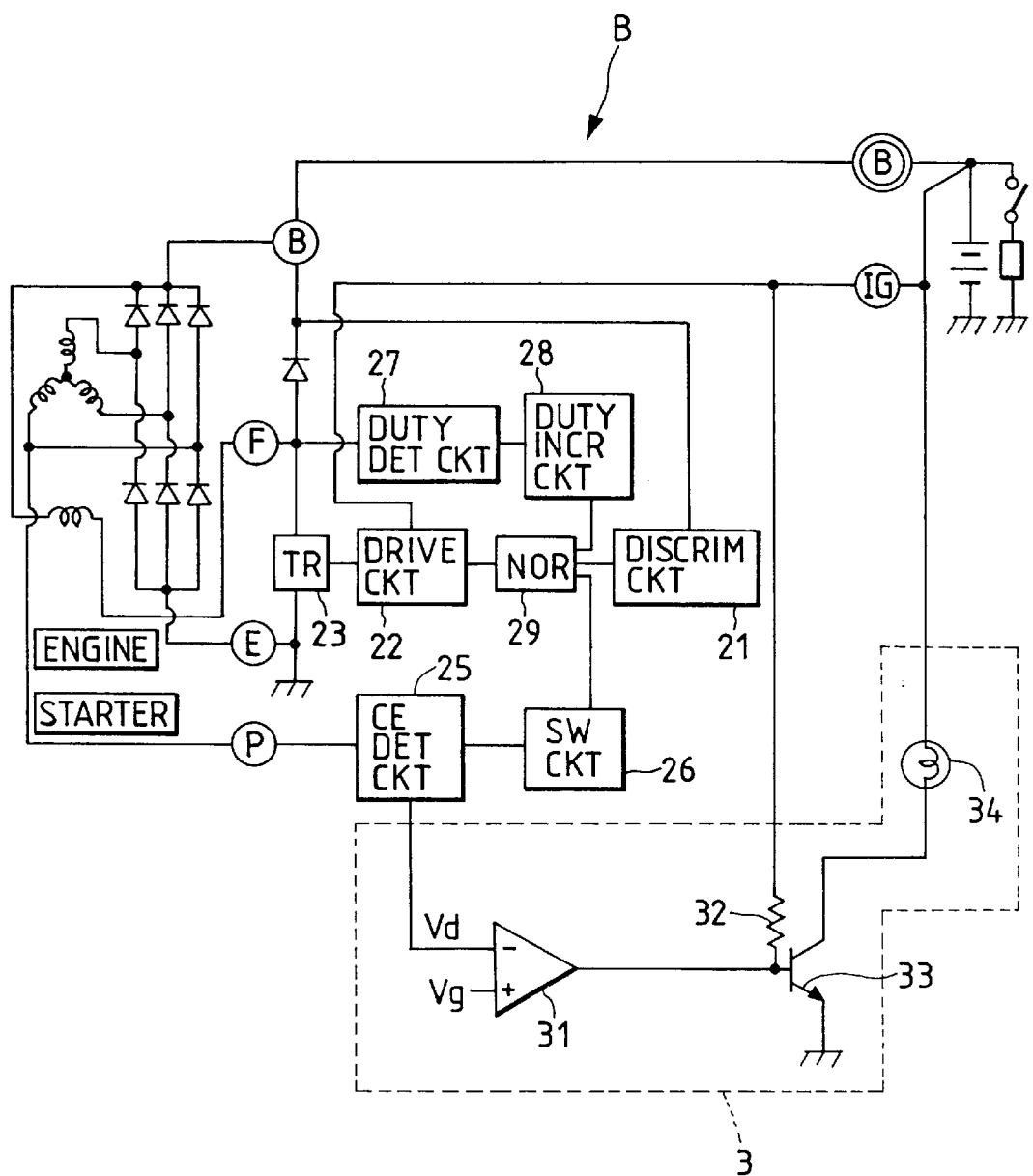
FIG. 5 is a block diagram showing a generator unit for a vehicle according to a second preferred embodiment of the present invention.

As shown in FIG. 5, a vehicle generator unit B includes a notifying circuit 3 which is added to the generator unit A in the foregoing first preferred embodiment for notifying a time point where the engine starts to rotate by itself.

The notifying circuit 3 includes a comparator for comparing the smoothed voltage Vd with a threshold value Vg for the lamp control, a bias resistor 32, a transistor 33 and a lamp 34.

The comparator 31 outputs a Hi signal to the transistor 33 when Vd<Vg. The transistor 33 turns on the lamp 34 in response to the Hi signal.

On the other hand, when the engine starts to rotate so that Vd≦Vg, the comparator 31 outputs a Lo signal to turn off the transistor 33 so that the lamp 34 is turned off.

As described above, by using the threshold value a and the duty selected in consideration of the P-terminal voltage characteristic, the complete explosion state of the engine can be detected based on the signal (P-terminal voltage VP) in the generator unit.

Now, the third preferred embodiment will be described hereinbelow with reference to FIGS. 6 and 7.

Figure 6:
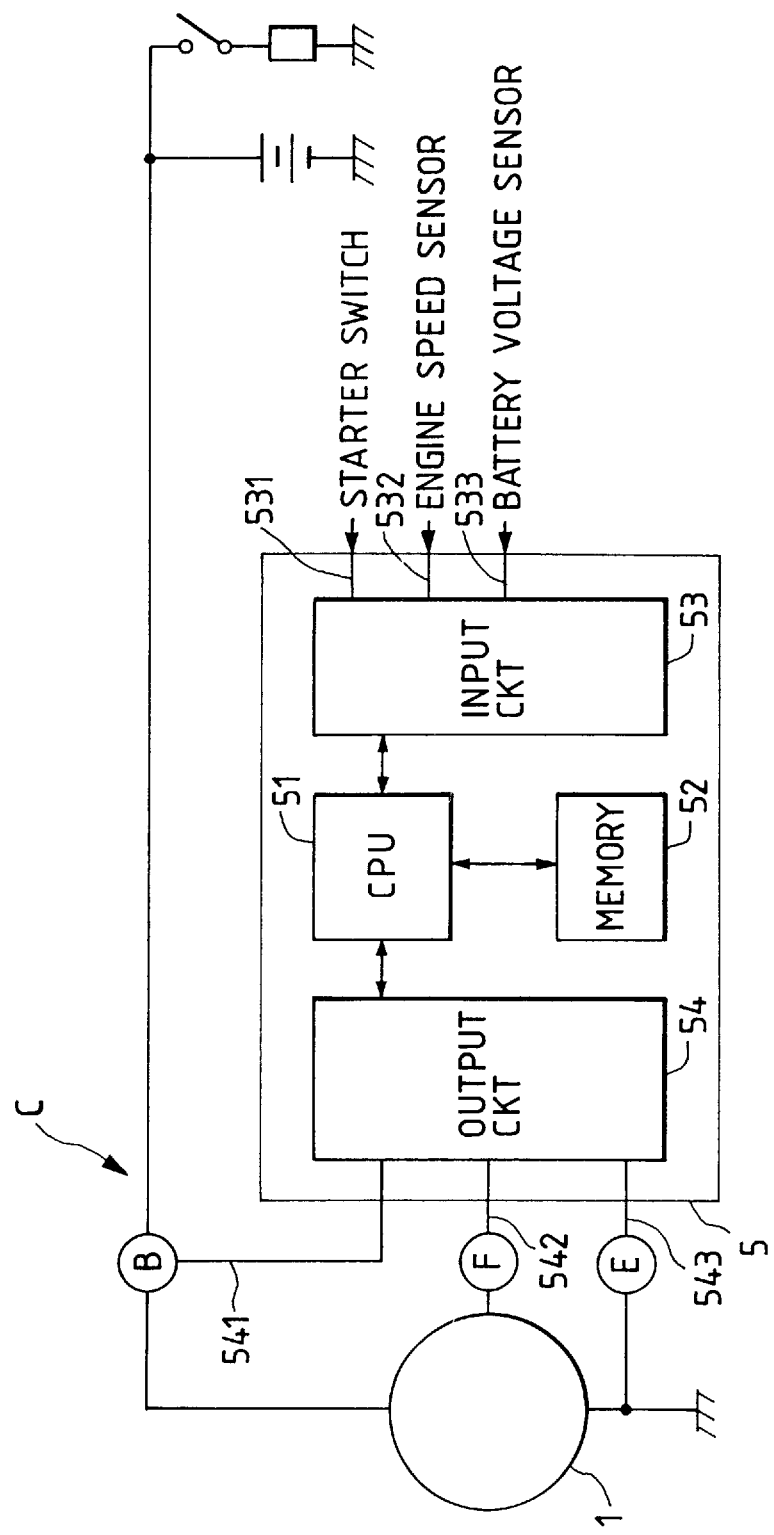
FIG. 6 is a block diagram showing a generator unit for a vehicle according to a third preferred embodiment of the present invention.
Figure 7:
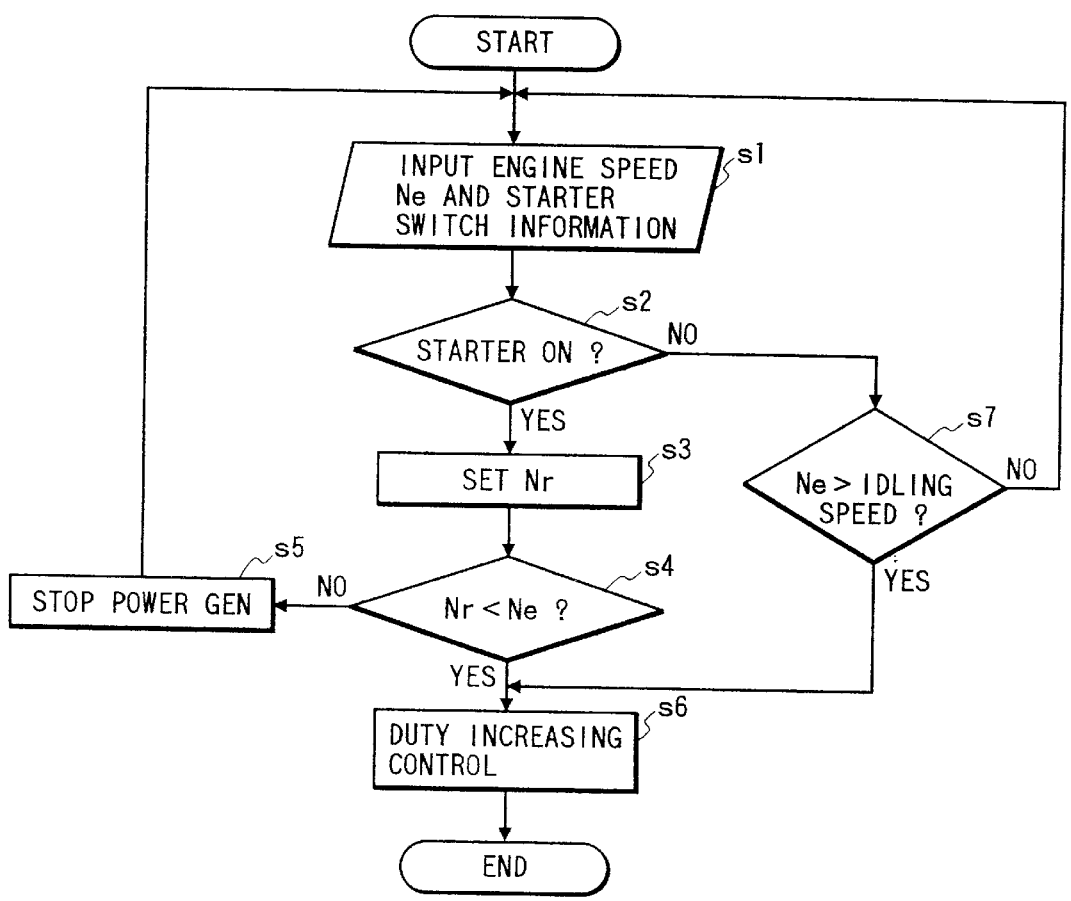
FIG. 7 is a flowchart showing an operation of the generator unit shown in FIG. 6.

As shown in FIG. 6, a vehicle generator unit C includes an alternator 1 driven by the engine and a generator control system 5.

In this embodiment, the generator control system 5 includes a microcomputer having a CPU 51, a memory 52, an input circuit 53 and an output circuit 54, and is disposed separately from the alternator 1. The alternator 1 and the output circuit 54 are connected by connection lines 541, 542 and 543, respectively. Further, the input circuit 53 and a starter switch are connected by a signal line 531, the input circuit 53 and an engine speed sensor by a signal line 532, and the input circuit 53 and a battery voltage sensor by a signal line 533.

The starter switch is for starting the starter. When a driver switches the starter switch to a "ST" position, a start signal is sent to the input circuit 53 via the signal line 531.

The engine speed sensor is, for example, for sending ignition pulses corresponding to the engine speed. The ignition pulses are sent to the input circuit 53 via the signal line 532.

The battery voltage sensor is connected to a positive terminal of the battery or the B terminal of the alternator 1 for monitoring the battery voltage. A detection signal is sent to the input circuit 53 via the signal line 533.

The output circuit 54 includes a transistor (not shown) for intermitting the field current supplied to the alternator 1. The output circuit 54 fixes the duty of the transistor to be 15% where the external power generation of the alternator 1 is rendered zero, until the CPU 51 determines the complete explosion of the engine. After the CPU 51 determines the complete explosion, the duty of the transistor is changed to 20%, and then increased to 100%, for example, in 7.5 seconds.

Now, an operation of the CPU 51 will be described hereinbelow based on a flowchart shown in FIG. 7.

At the start of the flowchart, the CPU instructs the output circuit 54 to stop the power generation, that is, to stop the external power generation of the alternator 1. In response to this instruction, the output circuit 54 fixes the duty of the transistor to be 15% (first set value).

At step s1, the start signal and the ignition pulses are inputted to the input circuit 53 via the signal lines 531 and 532 so that the CPU 51 receives the starter switch information and the engine speed Ne.

At step s2, it is determined based on the engine speed Ne and the starter switch information whether the starter is operated. If operated, that is, the engine is rotated by the starter, the routine proceeds to step s3. On the other hand, if not operated, the routine proceeds to step s7.

At step s3, the complete explosion engine speed Nr (threshold value) is set, which has been predetermined through experiments to be greater than the maximum cranking speed at the low temperatures.

Subsequently, at step s4, it is determined whether the engine microcomputer. speed Ne exceeds the threshold value Nr. If Nr<Ne, the routine proceeds to step s6 as determining that the engine is in the complete explosion state. On the other hand, if Nr≧Ne, the routine proceeds to step s5 as determining that the engine is not in the complete explosion state yet.

At step s5, the power generation stopping control (the control for stopping the external power generation of the alternator 1) is continued, and then the routine returns to step s1.

At step s6, the duty of the transistor is changed to 20% (second set value), and then increased to 100%, for example, in 7.5 seconds. When the duty of the transistor reaches 100%, the alternator control at the start of the engine is finished.

At step s7, it is determined whether the monitored engine speed Ne exceeds the idling speed. If Ne>idling speed, the routine proceeds to step s6 as determining that the engine cranking has been finished. On the other hand, if Ne≦idling speed, the routine returns to step s1 as determining that the engine is under cranking.

Now, the advantages in this preferred embodiment will be described hereinbelow.

[C] During cranking (while Ne≦Nr is established), the power generation stopping control is performed to prevent the external power generation of the alternator 1 so that the cranking force of the starter is not reduced and thus can be fully used for the engine start-up.

After the detection of complete explosion (when Ne>Nr is established), the duty increasing control is performed so as to start the external power generation of the alternator 1 and gradually increase the duty of the transistor.

With this arrangement, the engine load is not abruptly increased so that the engine speed can be increased smoothly. Thus, the vehicle generator unit C is excellent in engine starting property, particularly at the low temperatures.

The third preferred embodiment may be modified as follows:

In the third preferred embodiment, the complete explosion engine speed Nr (threshold value) which has been predetermined through experiments to be greater than the maximum cranking speed at the low temperatures, is set at step s3. On the other hand, it may be arranged that, based on a temperature of the engine cooling water detected by the water temperature sensor before the start-up of the engine, the complete explosion engine speed Nr is set larger as the detected temperature is lower.

With this arrangement, the duty increasing control can be started at a proper timing depending on the ambient temperature. Thus, for example, during the warm or hot weather, the power generation stopping period can be prevented from being too long (if too long, the battery is over-discharged).

In the third preferred embodiment, at step s6, the duty of the transistor is changed to 20% (second set value), and then increased to 100%, for example, in 7.5 seconds. On the other hand, based on the temperature of the engine cooling water monitored by the water temperature sensor, either one or both of the second set value and the duty increasing time (or the duty increasing speed) may be set to (first set value +5% (cold weather)~+10% (hot weather)) and/or (5 seconds (hot weather)~10 seconds (cold weather)).

With this arrangement, the duty increasing control can be achieved properly depending on the ambient temperature.

Further, the foregoing preferred embodiments may be modified as follows:

(A) The duty increasing time (Tc) is expressed by the following equation:

$$Tc = R \times C \times [\{(1-D1)/\alpha\} - 1]$$

wherein R represents a resistance value of the resistor 271, C a capacitance of the capacitor 272, α a duty to be increased, and D1 a switching duty of the transistor 23.

Accordingly, the duty increasing time can be adjusted by changing R, C and α.

(B) It may be arranged that a relatively long duty increasing time (5 seconds to 10 seconds) is set only at the start of the engine, while a relatively short duty increasing time (2.5 seconds to 5 seconds) is set under the normal engine operation. With this arrangement, the variation (lowering) of the battery voltage during the normal engine operation can be suppressed.

(C) In each of the foregoing preferred embodiments, the power generation stopping control is performed by means of the switching transistor. On the other hand, for example, in an alternator of a three-diode exciting type where the field current is supplied directly from auxiliary diodes other than output diodes, it may be arranged that the current is supplied at the rate of about 15% to the field coil via current limiting elements (for example, a resistor and a transistor) connected to the battery so as to achieve the power generation stopping control.

While the present invention has been described in terms of the preferred embodiments, the invention is not to be limited thereto, but can be embodied in various ways without departing from the principle of the invention as defined in the appended claims.

What is claimed is:

1. A generator control system for controlling an output of a generator driven by an engine, comprising:
   means for producing an output command value;
   an output control device for changing the generator output in response to said output command value;
   discriminating means for detecting a rotating state of said generator in order to discriminate between an engine cranking state and an engine self-rotating state;
   suppressing means for suppressing the output command value to said output control device in order to suppress the generator output when said engine cranking state is discriminated by said discriminating means; and
   increasing means for gradually increasing the output command value after a shift from said engine cranking state to said engine self-rotating state is detected by said discriminating means.

2. The generator control system according to claim 1, wherein said discriminating means comprises detecting means for producing a detection signal indicative of an engine speed, said discriminating means having a detection level which is set between an upper limit speed when the engine is cranked and a lower limit speed under idling where the engine rotates by itself, and wherein said discriminating means discriminates between said engine cranking state and said engine self-rotating state based on a comparison between said detection level and said detection signal produced by said detecting means.

3. The generator control system according to claim 2, wherein said detecting means produces said detection signal based on the generator output outputted as a function of the engine speed.

4. The generator control system according to claim 1, wherein said output control device is an element which controls an exciting current of the generator in response to the output command value.

5. The generator control system according to claim 1, further comprising display means which changes a display state when said engine self-rotating state is discriminated by said discriminating means.

6. A generator control system for charging a battery by means of an output of an alternator driven by a vehicle engine, comprising:
   a supply circuit for supplying the alternator with an exciting current depending on a control signal;
   a control circuit for outputting the control signal of said supply circuit so that a voltage of the battery converges to a given target value;
   a suppressing circuit for outputting a fixed control signal, said fixed control signal suppressing the output of the alternator to a small value such that no charging current to the battery is generated;
   a gradually exciting circuit for liming an increasing rate of the control signal given to said supply circuit;
   a discriminating circuit for discriminating between an engine cranking state and an engine self-rotating state based on an output from the alternator determined depending on the fixed control signal from said suppressing circuit; and
   a control characteristic changing circuit for giving the control signal from said suppressing circuit to said supply circuit when said engine cranking state is discriminated by said discriminating circuit, and for giving the control signal from said control circuit to said supply circuit under the limitation by said gradually exciting circuit when said engine self-rotating state is discriminated by said discriminating circuit.

7. The generator control system according to claim 6, wherein said gradually exciting circuit comprises an integrating circuit for integrating an exciting current supply amount by said supply circuit, and a limiting circuit for limiting the control signal given to said supply circuit depending on an integration output from said integrating circuit.

8. The generator control system according to claim 6, wherein said discriminating circuit has a detection level which is set between an upper limit speed when the engine is cranked and a lower limit speed under idling where the engine rotates by itself, and wherein said discriminating circuit discriminates between said engine cranking state and said engine self-rotating state based on a comparison between said detection level and the output of the alternator.

9. The generator control system according to claim 8, wherein said suppressing circuit feeds the fixed control signal corresponding to an exciting current which can be continuously supplied to the alternator in a state where the alternator is not rotated.

10. The generator control system according to claim 9, wherein said suppressing circuit feeds the fixed control signal representing the duty of said supply circuit of no more than 20%.

11. The generator control system according to claim 10, wherein said suppressing circuit feeds the fixed control signal representing the duty of said supply circuit of about 15%.

12. A generator control system for controlling an output of a generator driven by an engine, comprising:
   means for producing an output command value;
   an output control device for changing the generator output in response to said output command value;
   discriminating means for detecting a rotating state of said generator in order to discriminate between an engine cranking state and an engine self-rotating state, said discriminating means includes detecting means for producing a detection signal based on the generator output as a function of engine speed and a detection level set between an upper limit speed, representative of an engine cranking state, and a lower limit speed, representative of an engine self-rotating state, wherein discriminating means discriminates between said engine cranking state and engine self-rotating state by comparing said detection signal with said detection level;
   suppressing means for suppressing the output command value to a fixed value in order to suppress the generator output, wherein discriminating means discriminates between discriminates between said engine cranking state and engine self-rotating state based on the generator output achieved by the suppressed output command value; and
   increasing means for gradually increasing the output command value to said output control device after a shift from said engine cranking state to said engine self-rotating state is detected by said discriminating means.

13. The generator control system according to claim 12, wherein said increasing means gradually increases the output command value starting from a value which is greater than the fixed output command value given by said suppressing means.

14. The generator control system according to claim 13, wherein said increasing means comprises control means for giving the output command value to said output control device so that the output of the generator converges to a given target value, integrating means for integrating the output command value given to said output control device, and limiting means for limiting the output command value given to said output control device depending on an integration output from said integrating means, and wherein said integrating means is arranged to further integrate a control amount of said output control device determined depending on the fixed output command value given by said suppressing means.

15. The generator control system according to claim 14, wherein said integrating means is arranged to integrate a control amount of said output control device determined depending on the output command value given to said output control device.

16. The generator control system according to claim 12, wherein said detecting means is inputted with an output of the generator at one end of stator coils of the generator.

17. The generator control system according to claim 12, wherein said suppressing means feeds the fixed output command value corresponding to an exciting current which can be continuously supplied to the generator in a state where the generator is not rotated.

18. The generator control system according to claim 17, wherein said suppressing means suppresses the output command value to said output control device to no more than 20%.

19. The generator control system according to claim 17, wherein said suppressing means suppresses the output command value to said output control device to about 15%.

20. A generator control system for controlling an output of a generator driven by an engine, comprising:

means for producing an output command value;

an output control device for changing the generator output in response to said output command value;

discriminating means for detecting a rotating state of said generator in order to discriminate between an engine cranking state and an engine self-rotating state, said discriminating means includes detecting means with an engine speed sensor signal for producing a detection signal based on the generator output as a function of engine speed and a detection threshold level set between an upper limit speed, representative of an engine cranking state, and a lower limit speed, representative of an engine self-rotating state, wherein discriminating means discriminates between said engine cranking state and engine self-rotating state by comparing said detection signal with said detection level;

suppressing means for suppressing the output command value to a fixed value in order to suppress the generator output when said engine cranking state is discriminated by said discriminating means; and increasing means for gradually increasing the output command value to said output control device after a shift from said engine cranking state to said engine self-rotating state is detected by said discriminating means.

21. The generator control system according to claim 20, further comprising means for detecting an operation of an engine starter, and wherein said discriminating means includes first discriminating means for discriminating said engine self-rotating state when the engine speed exceeds said detection level during the engine starter being operated, and second discriminating means for discriminating said engine self-rotating state when the engine speed exceeds said lower limit idling speed during the engine starter being stopped.

22. A generator control system for controlling an output of a generator driven by an engine, comprising:

means for producing an output command value;

an output control device for changing the generator output in response to said output command value;

discriminating means for detecting a rotating state of said generator in order to discriminate between an engine cranking state and an engine self-rotating state;

suppressing means for suppressing the output command value in order to suppress the generator output when said engine cranking state is discriminated by said discriminating means; and increasing means for gradually increasing the output command after a shift from said engine cranking state to said engine self-rotating state is detected by said discriminating means, said increasing means includes control means for supplying said output command value to said output control device so that the generator output converges to a given target value and a limiting means for limiting an increasing rate of said output command value supplied by control means.

23. The generator control system according to claim 22, wherein said control means is integrated with the generator.

24. The generator control system according to claim 23, wherein said control means includes a microcomputer.

* * * * *